(12) United States Patent
Hirsa et al.

(10) Patent No.: US 8,729,515 B2
(45) Date of Patent: *May 20, 2014

(54) PINNED CONTACT, OSCILLATING LIQUID-LIQUID LENS AND IMAGING SYSTEMS

(75) Inventors: Amir H. Hirsa, Clifton Park, NY (US); Bernard A. Malouin, Jr., Troy, NY (US); Michael J. Vogel, Voorhees, NJ (US); Lili Cheng, Rexford, NY (US); Joseph D. Olles, Schenectady, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 358 days.

This patent is subject to a terminal disclaimer.

(21) Appl. No.: 13/190,980

(22) Filed: Jul. 26, 2011

(65) Prior Publication Data

US 2012/0027247 A1 Feb. 2, 2012

Related U.S. Application Data

(60) Provisional application No. 61/368,020, filed on Jul. 27, 2010.

(51) Int. Cl.
*G01N 15/06* (2006.01)
*G02B 1/06* (2006.01)
*H04N 17/02* (2006.01)

(52) U.S. Cl.
USPC ............................ 250/573; 359/665; 348/187

(58) Field of Classification Search
USPC ...................... 250/208.1, 216, 239, 573–577; 359/665–667; 348/187, 360
See application file for complete search history.

(56) References Cited

U.S. PATENT DOCUMENTS 4,168,482 A 9/1979 Sternberg
5,952,651 A 9/1999 Morito et al.
(Continued)

FOREIGN PATENT DOCUMENTS

EP 1 835 313 A1 9/2007
EP 1 870 740 A1 12/2007
WO WO 2006/009514 A1 1/2006

OTHER PUBLICATIONS

Hirsa et al., Notice of Allowance for U.S. Appl. No. 13/191,004, filed Jul. 26, 2011 (U.S. Patent Publication No. 2012/0026599 A1), dated Jul. 11, 2013 (18 pgs.).

(Continued)

*Primary Examiner* — Kevin Pyo
*Assistant Examiner* — Don Williams
(74) *Attorney, Agent, or Firm* — Kevin P. Radigan, Esq.; Heslin Rothenberg Farley & Mesiti P.C.

(57) ABSTRACT

An oscillating liquid lens and imaging system and method employing the lens are provided. The liquid lens includes a substrate with a channel opening extending through the substrate. A liquid drop is disposed within the channel and is sized with a first droplet portion, including a first capillary surface, protruding away from a first substrate surface, and a second droplet portion, including a second capillary surface, protruding away from a second substrate surface. The liquid lens further includes an enclosure at least partially surrounding the substrate, and including a chamber. The liquid drop resides within the chamber, and the liquid lens includes a second liquid disposed within the chamber in direct or indirect contact with the liquid drop, and the liquid lens further includes a driver for oscillating the liquid drop within the channel.

25 Claims, 13 Drawing Sheets

(56) References Cited

U.S. PATENT DOCUMENTS

| | | | |
|---|---|---|---|
| 6,328,421 | B1 | 12/2001 | Kojima et al. |
| 7,245,440 | B2 | 7/2007 | Peseux |
| 7,264,162 | B2 | 9/2007 | Barkman |
| 7,359,124 | B1 | 4/2008 | Fang |
| 7,369,321 | B1 | 5/2008 | Ren et al. |
| 7,440,193 | B2 | 10/2008 | Gunasekaran et al. |
| 7,545,430 | B2 | 6/2009 | Nakagawa |
| 2006/0092519 | A1 | 5/2006 | Hasei |
| 2006/0166411 | A1 | 7/2006 | Morisue et al. |
| 2007/0030573 | A1 | 2/2007 | Batchko et al. |
| 2007/0127120 | A1 | 6/2007 | Onuki et al. |
| 2008/0019015 | A1 | 1/2008 | Fernandez et al. |
| 2008/0245872 | A1 | 10/2008 | Good |
| 2009/0052000 | A1 | 2/2009 | Sakata |
| 2009/0072037 | A1 | 3/2009 | Good et al. |
| 2009/0316003 | A1 | 12/2009 | Hirsa et al. |
| 2010/0232028 | A1 | 9/2010 | Takai |
| 2011/0122504 | A1 | 5/2011 | Rodríguez Fernández et al. |
| 2012/0026599 | A1* | 2/2012 | Hirsa et al. ............... 359/665 |

OTHER PUBLICATIONS

International Search Report & Written Opinion of PCT/US2011/045346 (PCT Publication No. WO 2012/015811 A1), dated Mar. 9, 2012.

International Search Report & Written Opinion of PCT/US2011/045353 (PCT Publication No. WO 2012/015813 A1), dated Mar. 21, 2012.

Hirsa et al., Notice of Allowance for U.S. Appl. No. 12/487,328, filed Jun. 18, 2009 (U.S. Patent Publication No. 2009/0316003), dated Feb. 16, 2012.

"Micro Light Sabers—Tunable Liquid Lens Can Make a Directional Movable Laser", (http://www.scientificblogging.com/news_articles/) (May 11, 2009).

Christensen, B., "Tunable Liquid Lens Glasses for the Masses", Technovelgy.com, (http://www.technovelgy.com/), (May 28, 2009).

Ren et al., "Tunable-Focus Liquid Lens Controlled Using a Servo Motor", Optics Express, vol. 14, No. 18 (Sep. 4, 2006).

Lee et al., "Focal Tunable Liquid Lens Integrated with an Electromagnetic Actuator", Applied Physics Letters, vol. 90, No. 12, 121129 (2007).

Ren et al., "Adaptive Dielectric Liquid Lens", Optics Express, vol. 16, No. 19 (Sep. 15, 2008).

"Fluid Lenses Fee the Pressure", Physicsword.com (http://physicsword.com/cws/article/news/24119) (May 28, 2009).

Cronis et al., "Tunable Liquid-Filled Microlens Array Integrated with Microfluidic Network", Optics Express, vol. 11, No. 19 (Sep. 22, 2003).

Mao et al., "Hydrodynamically Tunable Optofluidic Cylindrical Microlens" Lab Chip, vol. 7, 1303-1308 (2009).

Huang, S., "Properties of a Liquid-Drip Variable Lens", (http://laser.physics.sunysb.edu/) (May 29, 2009).

Lopez et al., "Fast Focusing Using a Pinned-Contact Oscillating Liquid Lens", Nature Photonics, vol. 2, No. 10 (Oct. 2008).

Hirsa et al., "Low-Dissipation Capillary Switches at Small Scales", Applied Physics Letters, vol. 86, No. 1, 014106 (2005).

Lopez et al., "Electrochemically Activated Adaptive Liquid Lens" Applied Physics Letters, vol. 87, No. 13, 134102 (2005).

Moran et al., "Fluidic Lenses with Variable Focal Length", Applied Physics Letters, vol. 88, No. 4, 041120 (2006).

Tsai et al., "Miniaturized Universal Imaging Device Using Fluidic Lens", Optics Letters, vol. 33, No. 3 (Feb. 1, 2008).

Wang et al., "Variable Focusing Microlens Chip for Potential Sensing Applications", IEEE Sensor Journal, vol. 7, No. 1 (Jan. 2007).

Lopez et al., "Varifocal Optics: Oscillating Liquid Lens Focuses in a Hundredth of a Second", Nature Photonics Advanced Online Publication (Sep. 21, 2008).

Kuiper et al., "Variable-Focus Liquid Lens for Miniature Cameras", Applied Physics Letters, vol. 85, No. 7 (Aug. 2004).

VonWaldkirch et al., "Oscillating Fluid Lens in Coherent Retinal Projection Displays for Extending Depth of Focus", Optics Communications, vol. 253, pp. 407-418 (2005).

Stan, C., "Liquid Optics: Oscillating Lenses Focus Fast", Nature Photonics, vol. 2 (Oct. 2008).

* cited by examiner

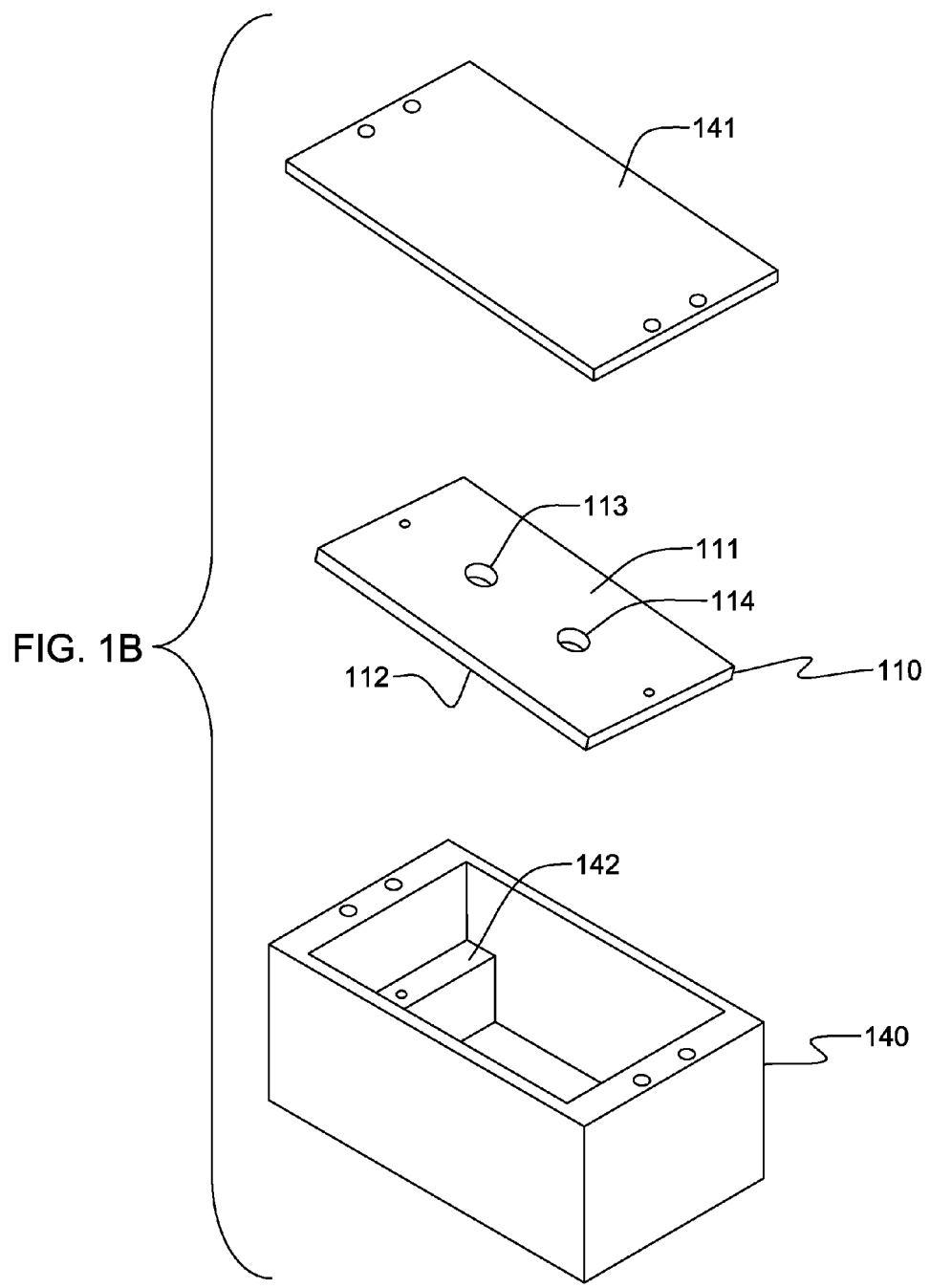

PINNED CONTACT, OSCILLATING LIQUID-LIQUID LENS AND IMAGING SYSTEMS

CROSS-REFERENCE TO RELATED APPLICATION

This application claims the benefit of U.S. Provisional Patent Application No. 61/368,020, filed Jul. 27, 2010, which is hereby incorporated herein by reference in its entirety.

STATEMENT REGARDING FEDERALLY SPONSORED RESEARCH

This invention was made with support from the Defense Advanced Research Projects Agency (DARPA) of the Department of Defense of the United States of America, under Contract No. HR001-09-1-0052. Accordingly, the United States government may have certain rights in the invention.

BACKGROUND

The present invention relates in general to adaptive optical devices, and more particularly, to liquid lenses, and to imaging systems and imaging methods employing the same.

Optical focusing is often a slow process due to the delay inherent in moving mechanically a camera's lens until an image is in focus. Although liquids are considered an exotic choice for lens material, there is interest in liquid lenses for applications in adaptive optics requiring fast response, or for applications that require small or cost effective optics. Liquid lenses advantageously avoid the increased weight and fabrication complexity associated with moving solid lenses. The interface of a liquid lens has good optical qualities because of surface tension, which dominates gravity in the sub-milliliter scale, and provides interfaces that are nearly perfectly spherical and optically smooth down to molecular scales.

The recent surge in the use of images and multimedia in consumer-level wireless communications has fueled the pursuit of lightweight and robust adaptive optics. The desire for such lenses extends beyond cell phones and camcorders, however, to advanced technologies in biomedical sensing and imaging, autonomous air and underwater vehicles for surveillance and defense, microscopy and adaptive lithography for micro-manufacturing, etc.

BRIEF SUMMARY

The shortcomings of the prior art are overcome and additional advantages are provided through the provision, in one aspect, of a liquid lens. The liquid lens includes a substrate comprising at least one channel extending through the substrate between a first surface and a second surface of the substrate, and a liquid drop comprising a first liquid. The liquid drop is disposed within one channel of the at least one channel extending through the substrate, and includes a first droplet portion with a first capillary surface protruding away from the first surface of the substrate, and a second droplet portion with a second capillary surface protruding away from the second surface of the substrate. The first droplet portion and the second droplet portion are connected through the one channel. The liquid lens further includes an enclosure which at least partially surrounds the substrate, and which includes a chamber. The one channel of the at least one channel extending through the substrate resides within the chamber of the enclosure. A second liquid is disposed within the chamber, and the second liquid and the liquid drop comprising the first liquid are in either direct or indirect contact within the chamber. A driver is provided for oscillating the liquid drop within the one channel extending through the substrate.

In another aspect, an imaging system is provided which includes a liquid lens and at least one image sensor. The liquid lens includes a substrate comprising at least one channel extending through the substrate between a first surface and a second surface of the substrate, and a liquid drop comprising a first liquid. The liquid drop is disposed within one channel of the at least one channel extending through the substrate, and includes a first droplet portion with a first capillary surface protruding away from the first surface of the substrate, and a second droplet portion with a second capillary surface protruding away from the second surface of the substrate. The first droplet portion and the second droplet portion are connected through the one channel. The liquid lens further includes an enclosure, which at least partially surrounds the substrate, and includes a chamber, wherein the one channel of the at least one channel extending through the substrate resides within the chamber of the enclosure. A second liquid is disposed within the chamber, and the second liquid and the liquid drop comprising the first liquid are in either direct or indirect contact within the chamber. A driver is provided for oscillating the liquid drop within the one channel extending through the substrate. The at least one imaging sensor is coupled to at least one imaging path passing through the first and second droplet portions of the liquid drop in the one channel for capturing an image through the first and second droplet portions of the oscillating liquid drop.

In yet another aspect, an imaging method is provided which includes: oscillating a liquid drop of a liquid lens, the liquid lens comprising a substrate defining a channel extending between a first surface and a second surface thereof, with the liquid drop being disposed within the channel, the liquid drop comprising a first droplet portion including a first capillary surface protruding away from the first surface of the substrate and a second droplet portion comprising a second capillary surface protruding away from the second surface of the substrate, wherein the first and second droplet portions of the liquid drop are connected through the channel, the liquid lens further including an enclosure at least partially surrounding the substrate and comprising a chamber, the one channel residing within the chamber and the chamber comprising a second liquid, the second liquid and the liquid drop comprising the first liquid being in direct or indirect contact within the chamber, and wherein the oscillating comprises applying an oscillating force to at least one of the first droplet portion or the second droplet portion to oscillate the liquid drop within the channel; and capturing at least one image by an image path passing through at least one of the first or second droplet portions of the liquid drop.

In a further aspect, a method of fabricating a liquid lens is provided which includes: obtaining a substrate which is non-wetting relative to a liquid drop; providing at least one channel in the substrate extending from a first surface to a second surface thereof; providing the liquid drop comprising a first liquid within one channel of the at least one channel extending through the substrate, the liquid drop comprising a first droplet portion with a first capillary surface protruding away from the first surface of the substrate and a second droplet portion with a second capillary surface protruding away from the second surface of the substrate, the first droplet portion and the second droplet portion being connected through the one channel; providing an enclosure comprising a chamber enclosing the one channel extending through the substrate, the first surface of the substrate facilitating defining a first chamber portion of the chamber, and the second surface of the substrate facilitating defining a second chamber portion of the chamber; disposing a second liquid within the first chamber portion and the second chamber portion of the chamber, the second liquid and the liquid drop being either in direct or indirect contact within the chamber.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1B is a partially exploded isometric view of the liquid-liquid lens of FIG. 1A, illustrating assembly thereof, in accordance with one or more aspects of the present invention;

DETAILED DESCRIPTION

Figure 1A:
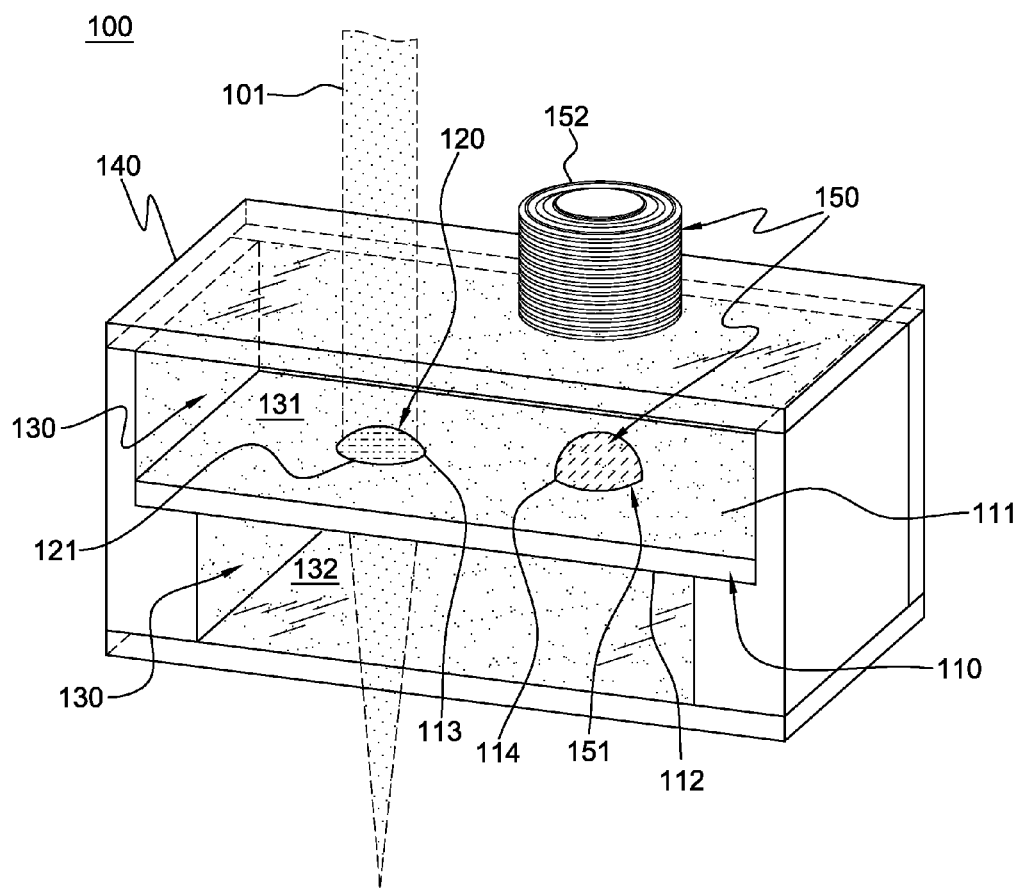
FIG. 1A is a cross-sectional illustration of one embodiment of a liquid-liquid lens, in accordance with one or more aspects of the present invention.

Disclosed herein is a significantly faster focusing paradigm, wherein instead of moving a lens to a final position, the shape of the lens described is continuously oscillated, and thus its focal distance is continuously oscillated. In a period of oscillation, the focal distance evolves through its full range of values, and a synchronized, high-speed sensor is employed to capture sharp images at different focal points. Focusing in the range of 0.01 seconds has been experimentally achieved, which was less than the period of oscillation. This was achieved by vibrating the system at its resonance frequency using a small (e.g., millimeter-size) liquid lens.

More particularly, described herein by way of example is a liquid-liquid lens with an oscillating focal distance, which can capture any image plane in a given range by grabbing the image "in synch" with the oscillations. By oscillating the lens, the task of changing the focal distance is effectively transformed from a mechanical manipulation to an electronic timing of image capture, which can be achieved significantly more quickly. High-fidelity imaging has been demonstrated at 100 Hz for a milliliter-scale liquid lens, driven at resonance and featuring pinned-contact lines. Theoretical predictions have shown that significantly faster responses are possible with scaled-down lenses.

While certain strategies have used membranes to contain a liquid lens, of particular interest is a liquid lens constrained only by the surface tension itself, primarily due to the deleterious effects of the membrane on image quality and the manufacturing challenges in producing a uniform and long-lasting membrane. However, even surface-tension-bound strategies have been awkward in practice, with gravity limiting apertures to a few millimeters and evaporation preventing stable operation beyond a few minutes.

Addressing these issues, disclosed herein are liquid-liquid lens structures and imaging systems and methods employing the same, which mitigate the shortcomings of previous liquid lenses by achieving stable operation at least as high as 30 Hz, centimeter-scale apertures, orientation independence, and long-term stability. The liquid-liquid lens is formed by coupling two droplets of a first, high-index of refraction liquid through a first channel (for example, a circular hole) in a substrate, such as a plate, and providing a second liquid, such as water, surrounding the plate and liquid lens, with the lens system being enclosed by an enclosure (such as a transparent acrylic box). By matching density of the first liquid droplets ($\rho_D$) with that of the surrounding liquid, such as water ($\rho_W$), the capillary length (scales with $(\rho_D-\rho_W)^{-1/2}$) can be increased from millimeters (for a typical liquid in gas liquid lens, such as a water lens in air) to centimeters.

To effect change in the curvature of the droplet (to achieve a focal distance change) it is desirable to actuate the enclosed lens system in a non-invasive manner. To this end, one or more second channels (or openings) are provided in the substrate, each of which accommodates two droplets of an immiscible ferrofluid. With a relatively small electromagnetic driver placed outside of the enclosure, the ferrofluid drop(s) can function as "liquid pistons," displacing the first liquid drop (i.e., the liquid lens) as the ferrofluid droplets move within the fixed volumes of first and second chamber portions on either side of the substrate. An oscillating voltage signal (e.g., 3 volts in amplitude) can be provided to the electromagnetic driver (such as a 150-turn electromagnet with an iron core) to produce an oscillating magnetic field, which in turn produces oscillatory motion of the ferrofluid drop(s), and consequently the liquid drop (that is, the liquid lens). For simplicity, a single electromagnet may be used to perturb a single ferrofluid drop (comprising two coupled ferrofluid droplets), with capillarity (i.e., spring-like) action being the restoring force.

Reference is made below to the drawings, which are not drawn to scale and which are simplified for ease of understanding, wherein the same reference numbers used throughout different figures designate the same or similar components.

FIG. 1A illustrates one embodiment of a liquid lens structure, generally denoted 100, in accordance with one or more aspects of the present invention. Liquid lens structure 100, which is alternatively referred to herein as a liquid-liquid lens structure, includes a substrate 110 having opposite first and second main surfaces 111, 112, respectively. Substrate 110 is non-wetting in relation to the lens and driver liquids, in the presence of a surrounding liquid such as water, and comprises, in one example, a hydrophobic material, such as anodized aluminum. The substrate 110 may itself be formed of such a non-wetting material, or be coated with the non-wetting material, but not necessarily within the one or more channels (or openings) described herein. In the depicted example, substrate 110 includes a first channel 113 and a second channel 114 extending therethrough between first main surface 111 and second surface 112. These first and second channels 113, 114 are depicted by way of example only. In other implementations, an array of multiple channels may be provided for either the liquid lens portion or the driver portion of the liquid-liquid lens system described herein. For example, in other implementations, multiple channels may be provided for either or both the liquid lens portion or the driver portion of the structure, each with a common transverse cross-sectional area (e.g., a common diameter), or with different transverse cross-sectional areas (e.g., different diameters), as desired. By providing channels with different cross-sectional areas, or different amounts of liquid protruding from channels of the same cross-sectional area, an array of coupled droplets may achieve different focusing characteristics or different drive characteristics.

Within first channel 113 of substrate 110, a liquid drop 120 is disposed. By way of example, each channel to accommodate a liquid drop (to function as the lens portion of the liquid lens system) may comprise a cylindrical-shaped hole (or bore) through the substrate, with each liquid drop being a drop of transparent liquid such as, for example, silicone oil. Those skilled in the art will note, however, that other liquids may alternatively be employed as the liquid lens. Because substrate 110 is non-wetting, the liquid drop 120 does not spread on the substrate, and the liquid-liquid-solid contact line between liquid drop 120, a second liquid 130 (e.g., water) within a chamber defined by an enclosure 140 (described below) and substrate 110 is pinned at the edge 121 of first channel 113. Liquid drop 120 may be characterized as including a first droplet portion 201 (see FIGS. 2A & 2B) comprising a first capillary surface which protrudes away from first surface 111 of substrate 110, and a second droplet portion 202 (FIGS. 2A & 2B) comprising a second capillary surface which protrudes away from second surface 112 of substrate 110. In this embodiment, the liquid drop and the second liquid are in direct contact and are immiscible, with the first and second capillary surfaces of liquid drop 120 being liquid-to-liquid interface surfaces of the liquid-liquid lens disclosed herein, which as noted above, are nearly perfect, spherical shapes, due to surface tension. The first and second droplet portions 201, 202 of liquid drop 120 are directly connected (i.e., interconnected) through a liquid body portion of liquid drop 120 disposed within first channel 113 of substrate 110.

The opposing curvatures of the droplet portions create a spring-like force that makes the liquid drop 120 a natural oscillator as force acts on its mass. In accordance with an aspect of the present invention, it can be demonstrated that for a range of parameters, the liquid drop 120 can be driven harmonically, such that the shapes of the droplet portions 201, 202 are essentially spherical and hence suitable for optics. Also, forcing the liquid lens at system resonance allows the oscillatory motion to be sustainable with very little energy input. Dissipation associated with moving contact lines, viscous or otherwise, is minimized by pinning the contact lines using the non-wetting substrate. Furthermore, the oscillations are made to occur at time- and length-scales where capillarity balances inertia, as opposed to viscosity. The natural frequency of the liquid lens scales with the radius of the lens as $R^{-3/2}$, and, as a result, a very-high-frequency response can be obtained with a modest size lens.

As noted, the illustrated liquid-liquid lens structure 100 of FIG. 1A further includes enclosure 140, second liquid 130 disposed within a chamber defined by enclosure 140, and a driver 150. In one embodiment, the chamber comprises a first chamber portion 131 and a second chamber portion 132, each of which is substantially filled with second liquid 130. In one embodiment, enclosure 140 includes a bottom wall, two front and back walls, two side walls, and a top (or lid), which may be removable to allow access to the interior of the enclosure, as depicted in FIG. 1B. In one embodiment, enclosure 140 is a transparent housing, with the side walls being configured with a ledge 142 to support and hold the substrate within the enclosure.

In one embodiment, driver 150 is configured to non-invasively, indirectly oscillate liquid drop 120 between first chamber portion 131 and second chamber portion 132. As one example, driver 150 may comprise a ferrofluid drop 151 disposed within second channel 114 extending between first main surface 111 and second main surface 112 of substrate 110, and an electromagnetic driver 152. By way of example, ferrofluid drop 151 may be characterized as including a first droplet portion 210 (see FIGS. 2A & 2B) comprising a first capillary surface which protrudes away from first surface 111 of substrate 110, and a second droplet portion 211 (see FIGS. 2A & 2B) comprising a second capillary surface which protrudes away from second surface 112 of substrate 110. First and second capillary surfaces of ferrofluid drop 151 are liquid-liquid interface surfaces in the liquid-liquid lens structure disclosed. The first and second droplet portions 210, 211 are directly connected (i.e., interconnected) through a liquid body portion of ferrofluid drop 151 disposed within second channel 114 of substrate 110.

The electromagnetic driver 152, such as a 150-turn electromagnet with an iron core, produces an oscillating magnetic field, which in turn produces oscillatory motion of ferrofluid drop 151, and consequently (via incompressible second liquid 130), oscillatory motion of liquid drop 120 (i.e., the liquid lens). As with liquid lens drop 120, the opposing curvatures of ferrofluid drop 151 create a spring-like force that makes ferrofluid drop 151 a natural oscillator, as force acts on its mass. Ferrofluid drop 151 functions as a "liquid piston," alternately displacing second liquid 130 within first chamber portion 131 and second chamber portion 132 as the ferrofluid drop oscillates, thus driving the liquid lens drop 120. In the illustrated embodiment, a single electromagnetic driver 152 is employed (by way of example) to perturb a single ferrofluid drop 151, with capillarity action being the restoring force. As explained further below, however, multiple electromagnetic drivers may be employed to more positively control oscillation of ferrofluid drop 151. In addition, in other implementations, multiple second channels 114 may be provided, with common transverse cross-sectional areas (e.g., a common diameter), or different transverse cross-sectional areas (e.g., different diameters). By providing multiple second channels 114 with different cross-sectional areas, or different amounts of ferrofluid drops protruding from the channels, different drive characteristics for the liquid lens system may be achieved, as explained further below.

Those skilled in the art will note from the description provided herein that the shape of liquid drop 120, and in particular, the upper and lower interfaces of the liquid drop, are continuous or intermittently altered with continuous or intermittent oscillation of ferrofluid drop 151 through the incompressible motion of the surrounding second liquid 130, thus producing an adaptive liquid lens that may be used to focus incident light 101.

FIG. 1B depicts one embodiment for assembling a liquid-liquid lens structure 100, in accordance with one or more aspects of the present invention. Note that this structure and method of fabrication are provided by way of example only. The fabrication process may include:

Pre-wetting the first and second channels 113, 114 of substrate 110 to ensure that the respective liquids in those channels will wet. To accomplish this, the channels through the substrate are swabbed with the respective first liquid (in first channel 113) or ferrofluid (in the second channel 114). During this process, the first and second main surfaces 111, 112 of substrate 110 are not contacted with either fluid, since if liquid is swabbed outside of the channels, pinning becomes difficult. The substrate is allowed to dry, leaving the residue of the liquids (only a small amount should be in either channel), which when using oils, will not dry completely.

Enclosure 140 is then filled with the immiscible second fluid 130 (see FIG. 1A), including over ledges 142 in the two side walls of enclosure 140. Note that filling the entire chamber of the enclosure is acceptable, knowing that the second fluid will overflow as pieces are added to the liquid-liquid lens structure.

Substrate 110 is then placed within the liquid-filled enclosure, holding the substrate at an angle to ensure that no gas bubbles are trapped under the substrate. The substrate is placed on and secured to flat ledges 142, ensuring that the immiscible, second liquid surrounds the substrate.

Next, a syringe may be used to begin filling first channel 113 with the first liquid. Start by contacting the syringe tip to the channel and working around the circumference while injecting fluid, until a capillary surface is completely formed across the diameter. After this occurs, the filling procedure can be done by keeping the syringe tip stationary and injecting the fluid into the column. The process is then repeated for the ferrofluid drop.

To ensure that each pair of coupled droplets are pinned, the droplets must be over-filled past the end of the channel. If all areas are not pinning, move the syringe tip in a circular motion around the rim of the channel (not adding more of the fluid), and again, not contacting the first main surface or second main surface of substrate 110.

After pinning has been established a set of the coupled droplets, the volume can be set. For example, by using the measurements on the syringe, or through visual inspection, the volume of each coupled droplet can be set. For visual inspection of the volume, the height (h) of each droplet is found from a profile view, knowing the radius of the channel (a), and using the formulation for a spherical cap, $V = \frac{1}{6}\pi h (a^2+h^2)$, the volume can be determined (for example, accomplished using a camera and LabView).

The same procedure is followed to establish the ferrofluid drop.

After both sets of coupled droplets are filled and pinned, the immiscible second liquid (i.e., surrounding liquid) is then added so as not to disrupt the coupled droplets, until overfilled condition (convex meniscus) is reached within the enclosure.

Finally, the top 141 of enclosure 140 can be secured onto the enclosure, for example, by placing it down onto the enclosure at an angle so as not to add gas bubbles to the lens system, and to displace the immiscible second liquid (i.e., surround liquid) as it seals out. The top 141 is affixed to the balance of the enclosure to form a fluid-tight, sealed chamber within the enclosure.

Figure 2A:
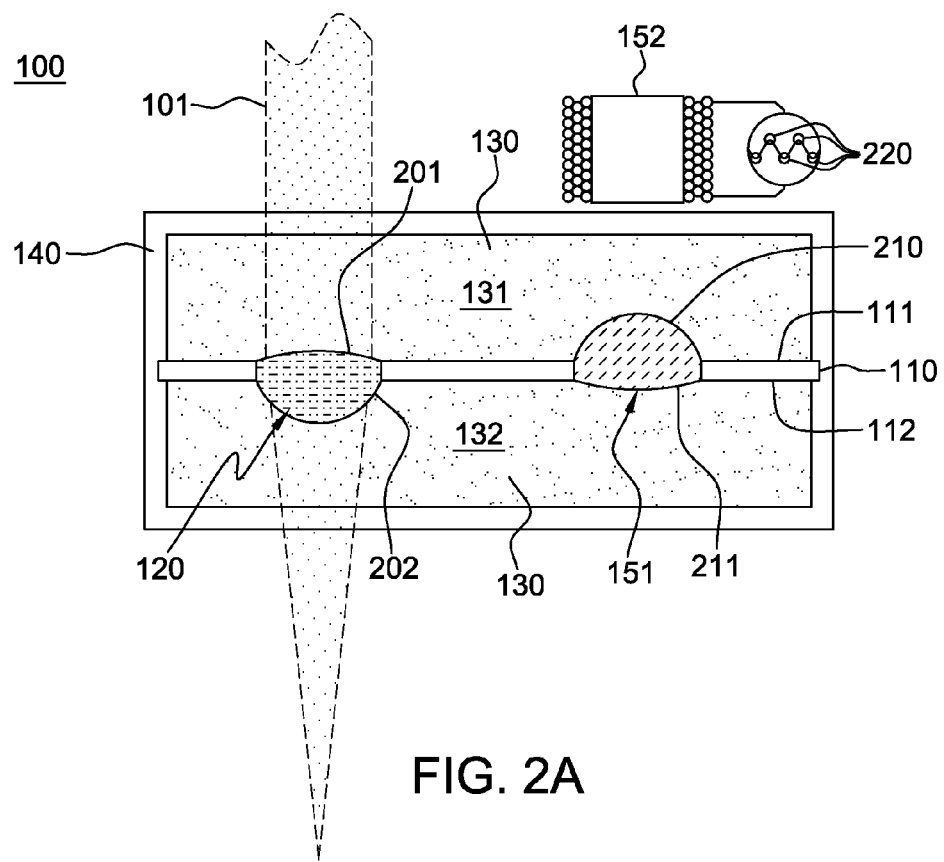
FIGS. 2A & 2B depict operational movement of the liquid drop of the liquid-liquid lens embodiment of FIG. 1A, responsive to a driver, wherein a second droplet portion with a second capillary surface protruding away from a second surface of the substrate is illustrated enlarged in FIG. 2A, and a first droplet portion with a first capillary surface protruding away from a first surface of the substrate is illustrated enlarged in FIG. 2B, in accordance with one or more aspects of the present invention.
Figure 2B:
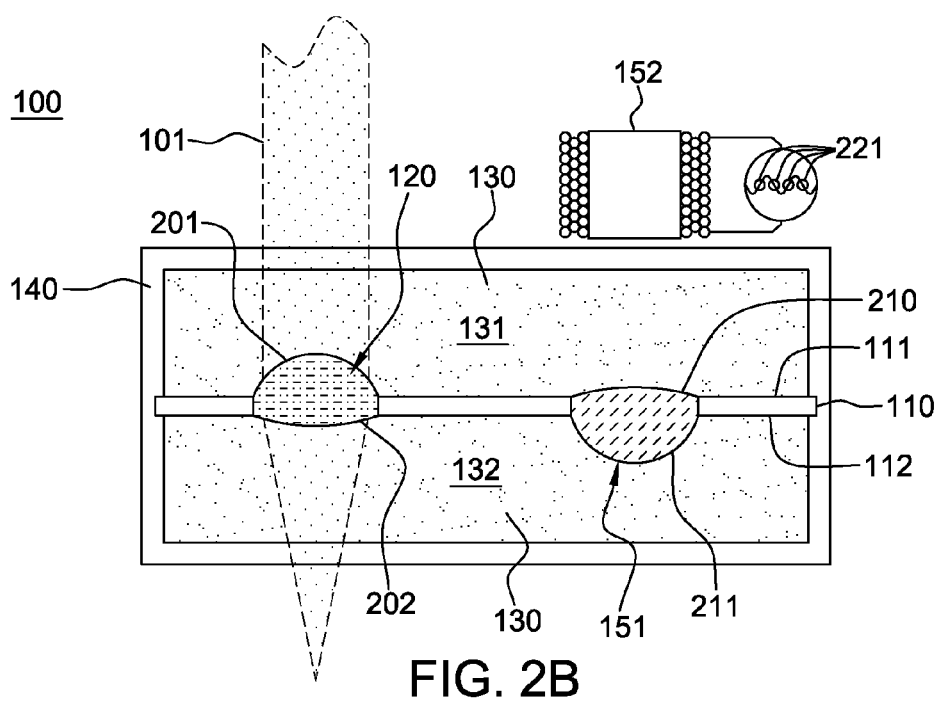

As noted, FIGS. 2A & 2B illustrate operation of a variable focal distance, liquid-liquid lens structure 100, in accordance with one or more aspects of the present invention. In operation, when electromagnetic drive 152 is in a magnetizing state 220, illustrated in the oscillatory signal applied to electromagnetic drive 152, first droplet portion 210 of ferrofluid drop 151 has a larger volume within first chamber portion 131 of enclosure 140 (as illustrated in FIG. 2A), and when the drive signal is deactivated 221 (FIG. 2B), inertia and surface tension cause the second droplet portion 211 of ferrofluid drop 151 to become larger within second chamber portion 132, as illustrated in FIG. 2B. When the electromagnetic drive is activated to operate on ferrofluid drive 151 to the extent illustrated in FIG. 2A, the incompressible second liquid 130 operates to force more of the first liquid in liquid drop 120 into second droplet portion 202 extending within second chamber portion 132 of enclosure 140. This in turn produces a longer focal distance in focusing incident light 101. In the opposite condition, where most of the first liquid is in the first droplet portion 201 in the first chamber portion 131 of enclosure 140, a shorter focal distance is achieved, as illustrated in FIG. 2B.

In this manner, the focal distance of liquid drop 120 continuously varies as the ferrofluid drop oscillates, which in turn varies the refraction of the incident light 101, and thereby the focal point, providing an adaptive focal distance capability in the liquid lens.

Figure 3:
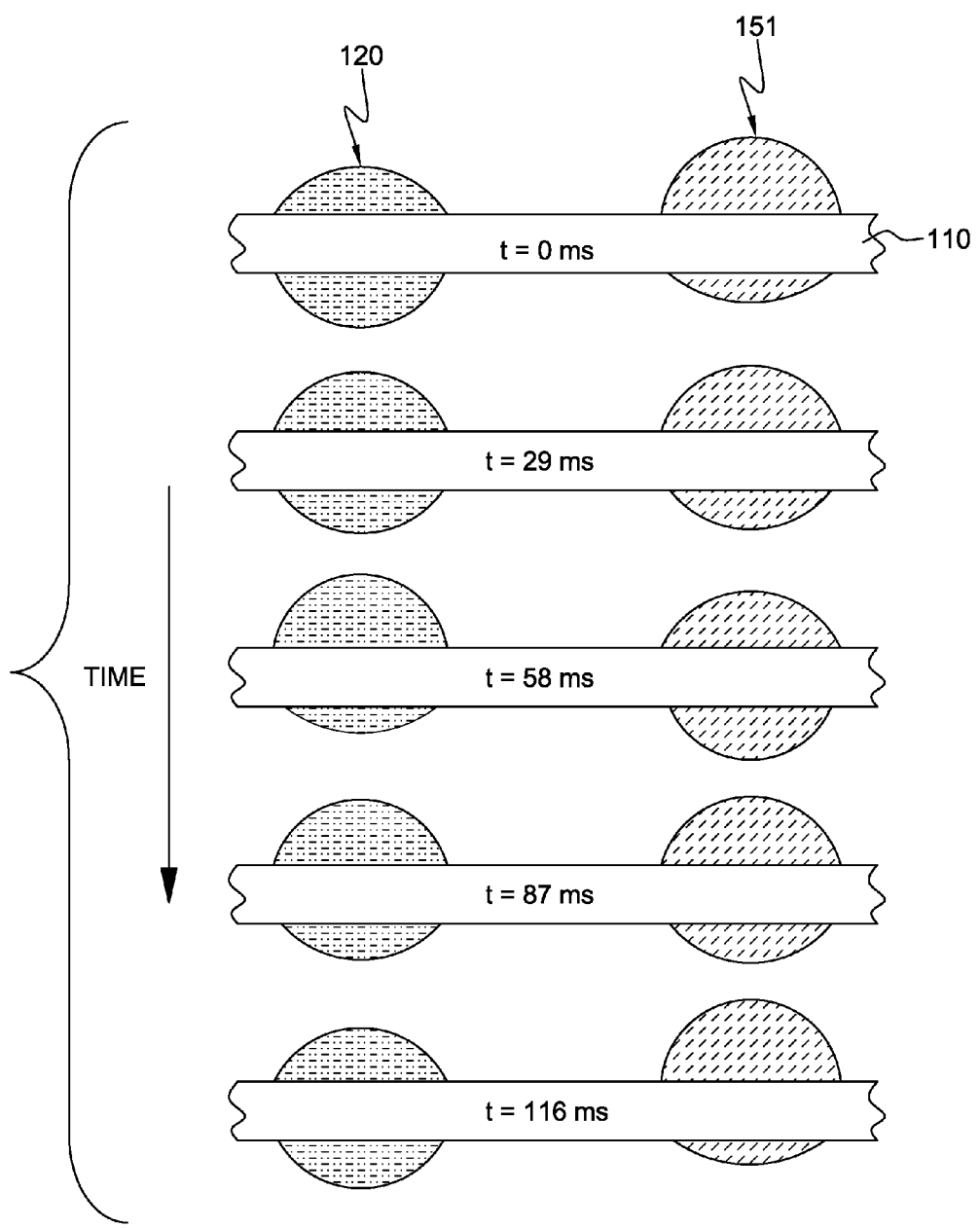
FIG. 3 is a time sequence of a pinned-contact, oscillating liquid-liquid lens driven by an electromagnetic signal applied to a ferrofluid drop on the right side of the illustrated lens structure, in accordance with one or more aspects of the present invention.

FIG. 3 depicts an operational example of the liquid-liquid lens disclosed herein. Note that in the structure described herein, the triple contact line (i.e., liquid-liquid-solid contact line) is fixed at the perimeters of each channel (or opening) formed through the substrate. These pinned contact lines eliminate viscous dissipation associated with advancing and receding contact lines encountered in many other adaptive liquid lens strategies. Moreover, the overall efficiency of the device may be increased by driving the device at system resonance. In the example of FIG. 3, the system is oscillating at resonance, and the motion and instantaneous shape of liquid drop 120 (e.g., a silicone oil liquid lens) is controlled by ferrofluid drop 151, with water (not shown) surrounding both sets of coupled droplets in the closed system. In this example, the first and second droplet channels are both 5 mm in diameter, and are driven with less than 5 volts (peak-to-peak). In the case considered in FIG. 3, the liquid lens system, including the surrounding water (not shown) exhibits resonance behavior at 8.6 Hz, with FIG. 3 illustrating one complete cycle.

The liquid-liquid lens structure disclosed herein may be incorporated and employed within various imaging systems.

Figure 4A:
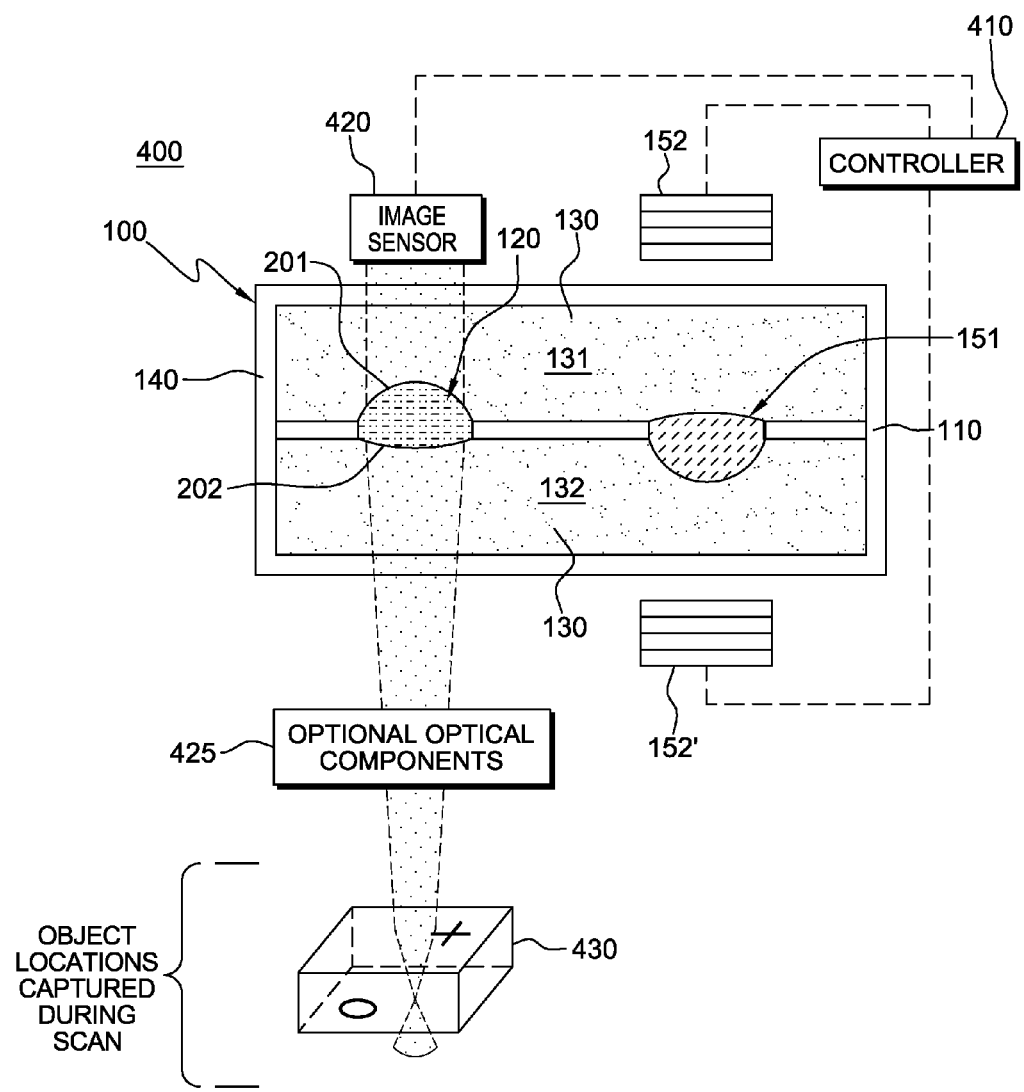
FIG. 4A is a schematic of one embodiment of an imaging system employing an oscillating liquid-liquid lens and illustrating imaging of an object in focus, in accordance with one or more aspects of the present invention.

FIG. 4A depicts one embodiment of an imaging system, generally denoted 400, employing an oscillating liquid-liquid lens structure 100, such as described above in connection with FIGS. 1A-3. As noted, liquid-liquid lens structure 100 includes a substrate 110 comprising at least one first channel through the substrate containing at least one liquid drop 120, which functions as the liquid lens, and at least one second channel containing at least one ferrofluid drop 151, which facilitates driving the liquid lens, as described herein. The liquid-liquid lens structure further includes an enclosure 140 defining a sealed chamber comprising a first chamber portion 131 and a second chamber portion 132 on opposite sides of the substrate, both of which are filled with a second liquid, such as water. The substrate is non-wetting and liquid drop 120 and ferrofluid drop 151 are pinned at the edges of their respective channels through substrate 110.

In the example of FIG. 4A, imaging system 400 further includes a controller 410, comprising, for example, a general purpose computer controller 410, which is provided with (for example) logic to control oscillation of ferrofluid drop 151, and thus, oscillation of liquid drop 120 of liquid-liquid lens structure 100, as well as the capture of one or more in-focus images via an image sensor 420. Note that in this example, two electromagnetic drives 152, 152' are employed in alignment above and below ferrofluid drop 151 to control the motion of the ferrofluid drop by producing sequential pull-forces on the coupled droplets, causing either the top side volume to become larger or the bottom side volume to become larger, as explained above. This in turn alters the protruding volume of the lens drop into the first chamber portion 131 or second chamber portion 132. By so displacing the lens drop 120, the radii of curvature of the coupled droplets are manipulated, which in turn alters the focal distance of an object 430. By placing image sensor 420 on one side of the liquid lens, and optional optical components 425 on the other side, objects 430 at various distances can be focused upon.

Note that in the depicted example, image sensor 420 is disposed above enclosure 140, which in one embodiment, is a transparent housing (or enclosure), and is aligned with an image path passing through liquid drop 120, and in particular, passing through the first oscillating droplet portion 201 and second droplet portion 202 of liquid drop 120. In addition, the image path passes through enclosure 140, and any additional optical components 425 (such as a large aperture lens), which may optimally be employed with the oscillating liquid lens described herein. The resultant imaging system has a focal distance within a defined range, wherein objects located within that range may be captured during scanning Note that the image sensor 420 may comprise any appropriate imaging device. In one example, the image sensor is part of a digital camera or video recorder.

As noted above, in an optical system with an oscillating focal distance such as depicted in FIG. 4A, the task of focusing changes. Instead of manipulating the position of a lens of fixed shape, the timing of the image recording is to be synchronized with the oscillations of the lens, and pictures should be taken inside the time interval during which the system is in focus. Fast electronic timing can be readily implemented using today's high-speed cameras. The result is a significantly faster adaptive lens than is possible with the mechanical movements of existing optics.

The oscillating liquid lens described herein is faster than the period of oscillation. By driving the system at its resonance frequency, for example, the lens' interfaces remain spherical, and the amplitudes of the oscillations are maximized. The combination of oscillating-focal-length lenses, with high-speed cameras, also provides the capability of three-dimensional (3-D) imaging. For example, a microscope objective based on an oscillating lens is capable of fast-scanning at different depths inside a sample under investigation. A high-speed camera could acquire in a single lens oscillation period enough images to produce the 3-D image by deconvolution. Such a system could also acquire 3-D microscopy movies in a frame rate equal to the lens oscillation rate. As one example, the EX-F1 high-speed camera, marketed by Casio, could be employed with the oscillating liquid lens described herein.

Figure 4B:
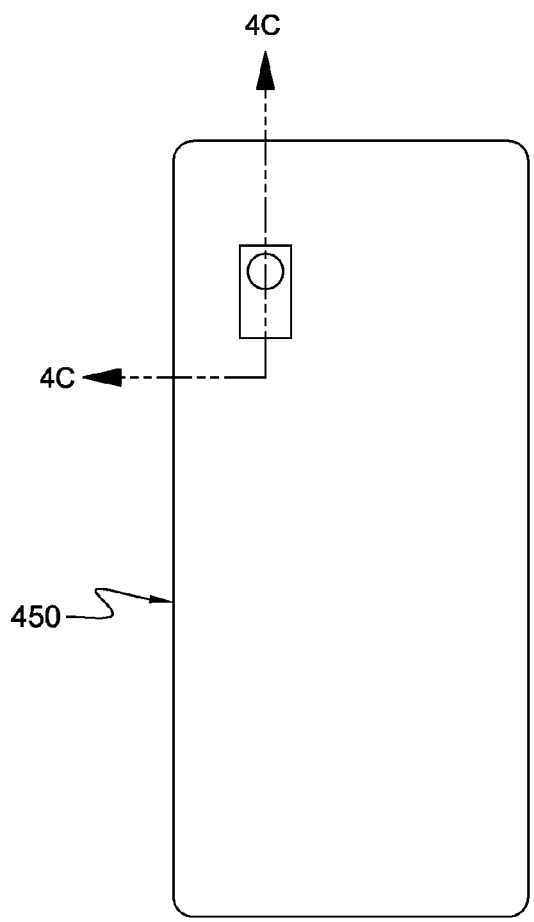
FIG. 4B depicts one embodiment of a packaged imaging system (such as a camera in a phone) comprising an oscillating liquid-liquid lens, in accordance with one or more aspects of the present invention.
Figure 4C:
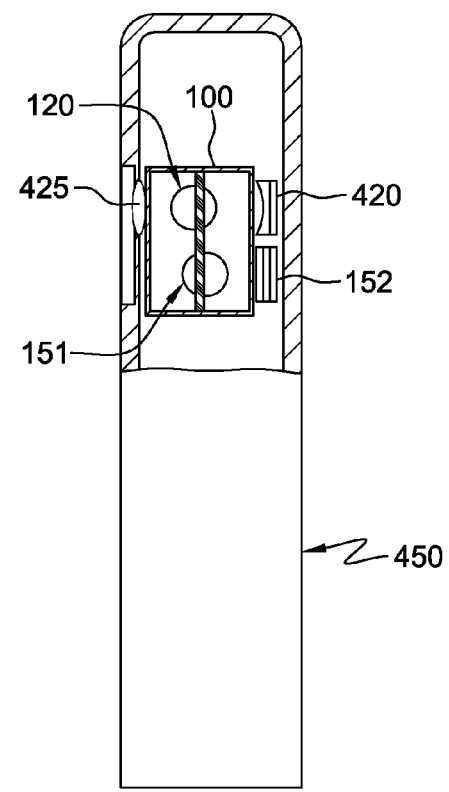
FIG. 4C depicts the packaged imaging system of FIG. 4B, taken along line 4C-4C thereof, and illustrating inclusion therein of another embodiment of an imaging system employing an oscillating liquid-liquid lens, in accordance with one or more aspects of the present invention.

FIGS. 4B & 4C depict the imaging system of FIG. 4A, implemented in a phone 450 as, for example, a phone camera. As illustrated in the partial cross-sectional view of FIG. 4C, the liquid-liquid lens structure 100 may be placed, in one embodiment, between an image sensor 420 and optional optical components 425. The motion of the ferrofluid drop 151, and consequently the liquid drop 120 (i.e., the liquid lens), is induced by a single electromagnetic drive 152 (in this example).

Figure 4D:
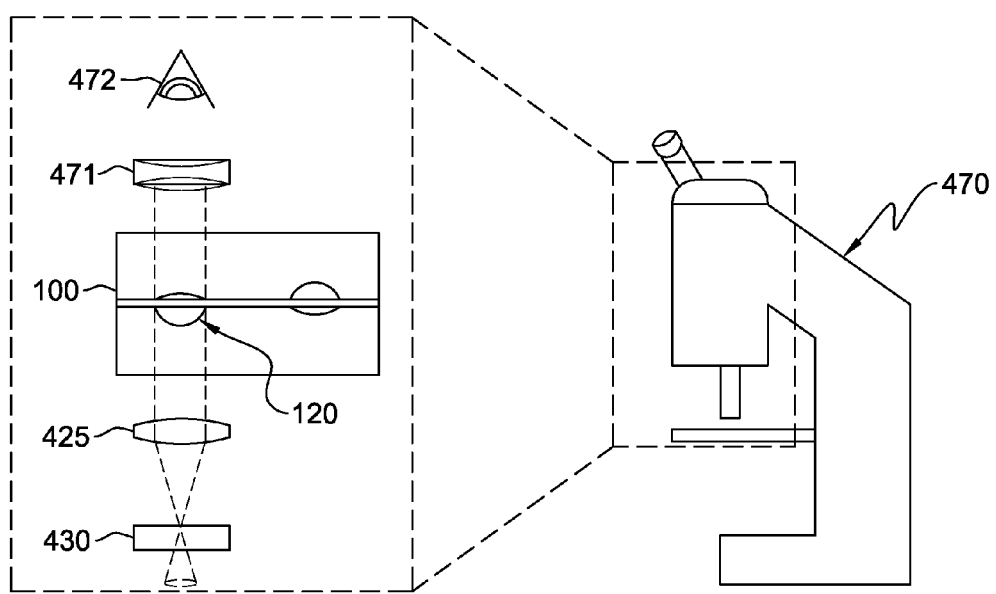
FIG. 4D depicts another embodiment of an imaging system (such as a scanning optical microscope) comprising an oscillating liquid-liquid lens, in accordance with one or more aspects of the present invention.

By way of further example, a liquid-liquid lens structure as described herein could be employed within a microscope 470, such as illustrated in FIG. 4D. In this imaging system, the liquid-liquid lens structure 100 is placed between the eyepiece 471 (or image sensor) and the objective, comprising optical components 425. By inducing a variation in the focal distance of the liquid drop 120 (i.e., the liquid lens), the viewer 472 (or, alternatively, an automated imaging sensor) can scan various depths of the target object 430.

Figure 5A:
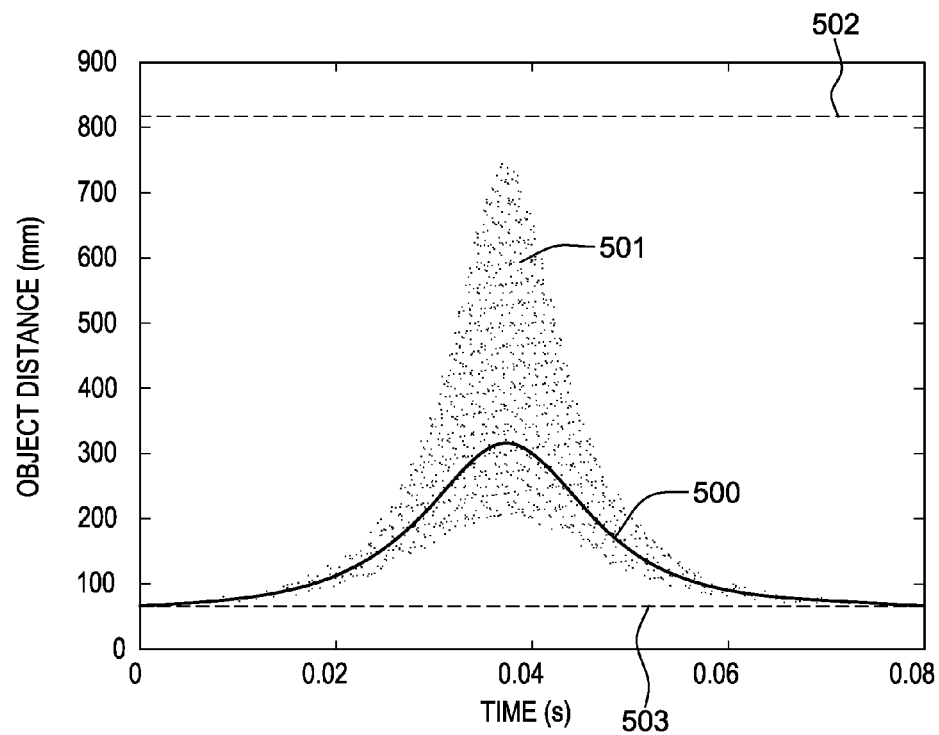
FIG. 5A graphically depicts results of an optical model for an oscillating liquid-liquid lens, and illustrates object distance in focus as a black curve, with the corresponding depth-of-field in grey shading, and with two targets being placed near the extremes of the focal range scan, indicated by the dashed lines, in accordance with one or more aspects of the present invention.

For supporting analysis, optical performance of a centimeter-scale, liquid-liquid lens as described herein was evaluated. In particular, results of a theoretical optical model for an oscillating liquid-liquid lens (with additional static elements in the optical train) were obtained, as illustrated in FIG. 5A. The object distance in focus is shown by the black curve 500, with the corresponding depth-of-field in grey 501. Two targets are placed near the extremes 502, 503 of the focal range scan. In this graph, the object distance that is in focus during a single period of oscillation is shown by the solid black curve 500.

Figure 5B:
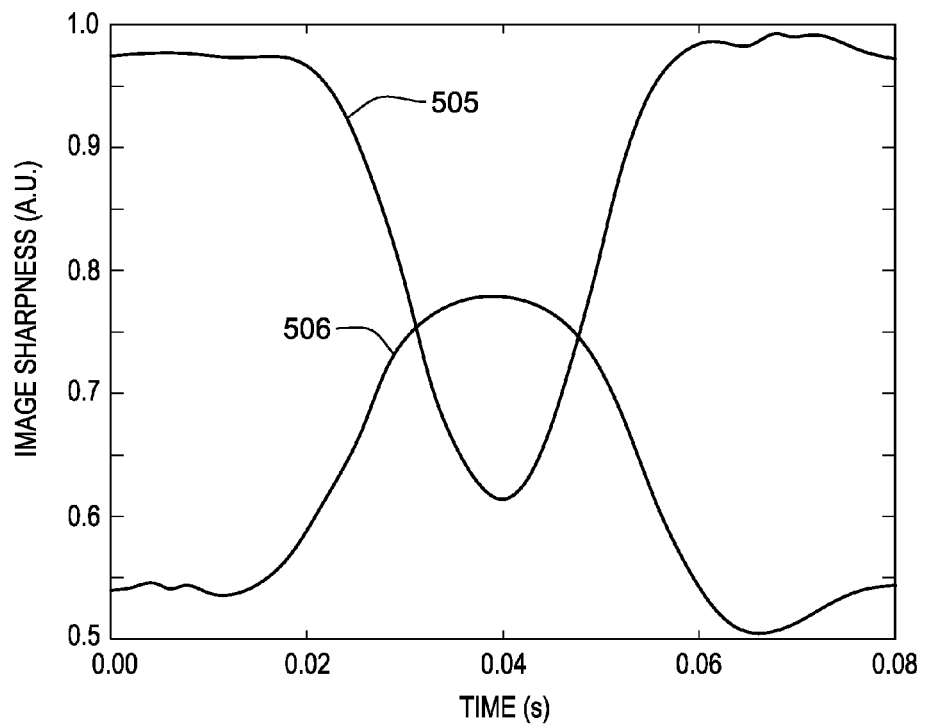
FIG. 5B shows experimental data obtained from analyzing the sharpness of images taken through the oscillating liquid-liquid lens (utilized as the objective of the optical train) of the two targets marked in FIG. 5A, in accordance with one or more aspects of the present invention.

FIG. 5B illustrates experimental data obtained from analyzing the sharpness of images taken through a liquid-liquid lens structure as described herein. In particular, the data was obtained by placing the liquid-liquid lens as the objective of the optical train of the two targets 502, 503 identified in FIG. 5A. The maximum sharpness of the two objects are fully out of phase, with curve 505 corresponding to object at 503 and curve 506 corresponding to object at 502, which is as expected from the model.

Figure 6A:
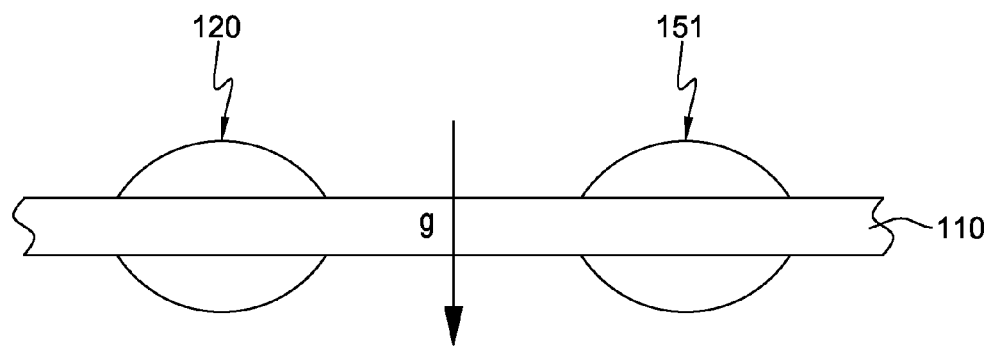
FIG. 6A is a partial depiction of a liquid-liquid lens structure, with direction of gravity (g) shown as top-to-bottom, in accordance with one or more aspects of the present invention.
Figure 6B:
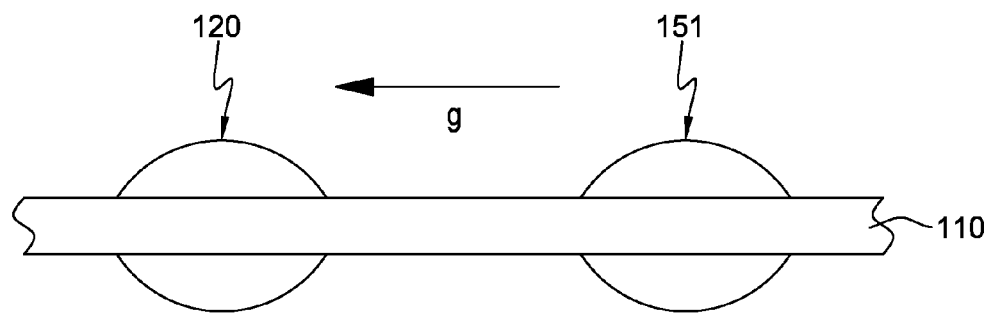
FIG. 6B is a partial depiction of the liquid-liquid lens of FIG. 6A turned with direction of gravity (g) shown as right-to-left, in accordance with one or more aspects of the present invention.

FIGS. 6A & 6B depict invariance of the liquid-liquid lens with different gravitational orientations. In FIG. 6A, the liquid-liquid lens structure is shown with the optical axis parallel to the direction of gravity vector (g), and FIG. 6B illustrates the liquid-liquid lens structure with the optical axis oriented perpendicular to the gravity vector (g). By keeping the gravitational bond number $B_0<1$, surface tension forces will dominate over gravitational body forces. Thus, the droplets can be made to retain their spherical shapes, regardless of the direction of gravity. In FIGS. 6A & 6B, the liquid-liquid lens system described is partially illustrated, including substrate 110 with the liquid drop 120 (functioning as the liquid lens) and ferrofluid drop 151 (functioning as the driver). As explained above, both drops comprise coupled droplets with first and second droplet portions respectively extending above and below the first and second main surfaces of substrate 110. With this configuration, the measured maximum departure from a uniform (spherical) radius of curvature for both cases illustrated in FIGS. 6A & 6B is less than 1%. Invariance to gravitational orientation can be further enhanced by density-matching the fluids employed in the liquid-liquid lens system.

Figure 7:
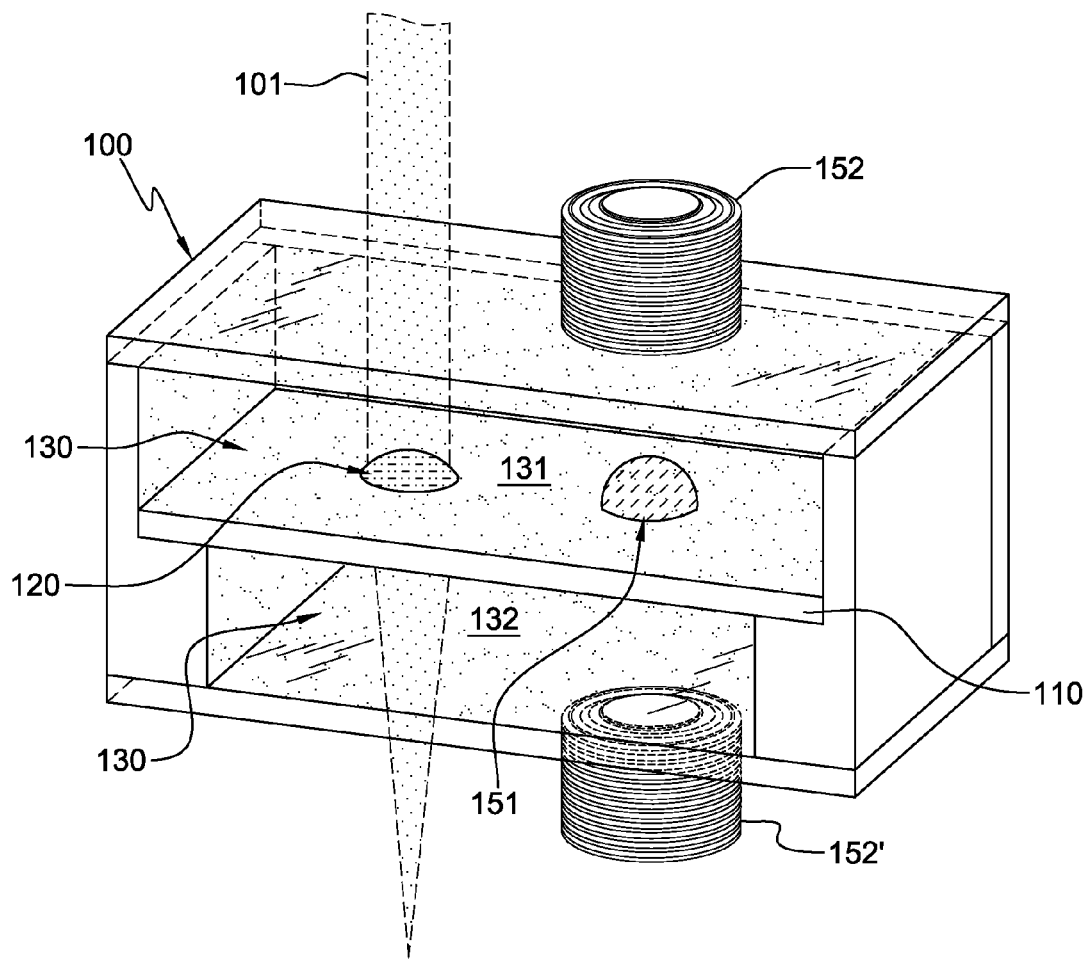
FIG. 7 is a cross-sectional illustration of another embodiment of a liquid-liquid lens, in accordance with one or more aspects of the present invention.

By way of further example, FIG. 7 depicts the liquid-liquid lens structure 100 of FIGS. 1A-3, with the dual electromagnetic driver 152, 152' of the imaging system embodiment of FIG. 4A. This liquid-liquid lens structure is a dual forcing structure, wherein the coupled ferrofluid droplets comprising ferrofluid drop 151, occupying the second channel in substrate 110, are controlled by electromagnetic drivers 152, 152' disposed above and below the ferrofluid drop. In particular, electromagnetic drivers 152, 152' may be energized 180° out of phase with each other to provoke ferrofluid drop oscillations, which are in turn transitioned to the liquid drop 120 (i.e., the liquid lens) through the corresponding movement of the incompressible immersion liquid 130 filling the first chamber portion 131 and second chamber portion 132 of the liquid-liquid lens structure. The result is an adaptive liquid lens that controllably focuses incident light 101, as described herein.

With the growing interest in web-based video, achieving an imaging rate of 30 frames per second for a given image plane is of interest. As the droplets oscillate, each image plane can come into focus twice (once while the droplet moves towards the object, and once while it travels away). Thus, system resonances in excess of 15 Hz are highly desirable. One such way to enhance the resonance frequency of the liquid-liquid lens system is to stiffen the effective springs in the system. As surface tension is the predominant spring (both in the liquid lens and the driver portion), increasing the effect of capillarity (by means of small drops) will increase overall system resonance frequency. Reducing the lens size may be counterproductive, so actuation with arrays of smaller drivers is one possible solution.

Figure 8A:
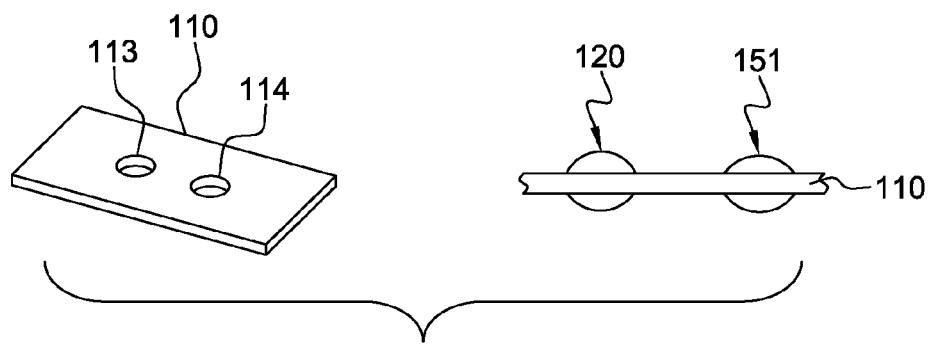
FIG. 8A is a partial depiction of a liquid-liquid lens, including the substrate thereof, in accordance with one or more aspects of the present invention.
Figure 8B:
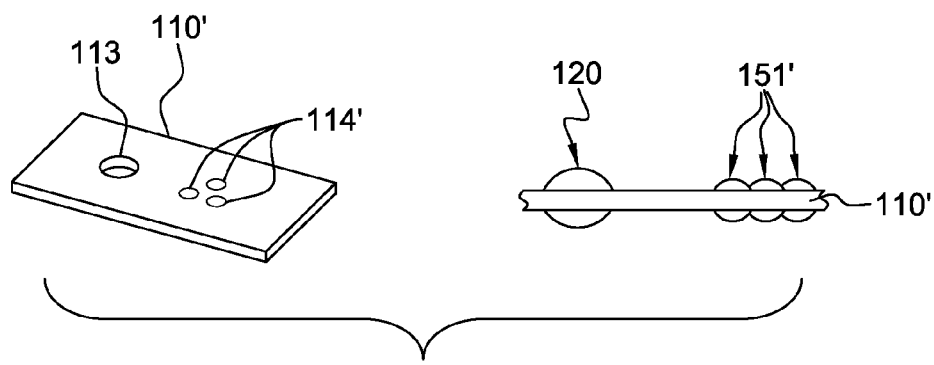
FIG. 8B is a partial depiction of an alternate embodiment of a liquid-liquid lens, including the substrate thereof, in accordance with one or more aspects of the present invention.
Figure 8C:
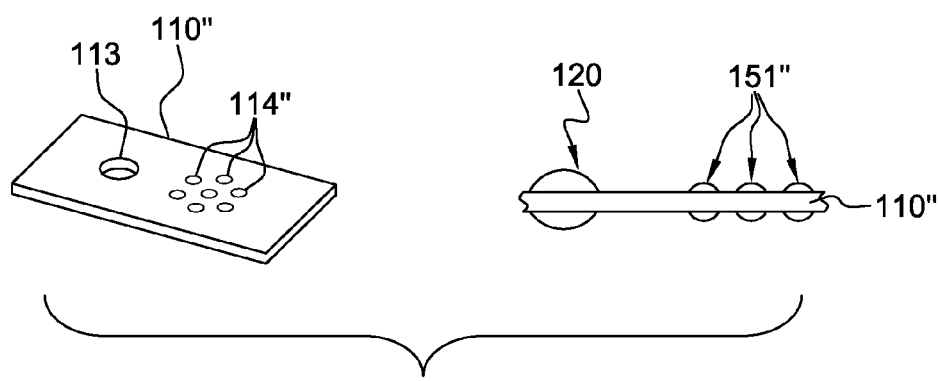
FIG. 8C is a partial depiction of a further embodiment of a liquid-liquid lens, including the substrate thereof, in accordance with one or more aspects of the present invention.

FIGS. 8A-8C illustrate three different substrates (i.e., substrate 110 (FIG. 8A), substrate 110' (FIG. 8B), and substrate 110" (FIG. 8C)), which may be employed in a liquid-liquid lens structure such as described herein.

In FIG. 8A, substrate 110 is substantially the same as that described above in connection with FIGS. 1A-7, wherein a first channel 113 and a second channel 114 are provided through the substrate 110 to accommodate the respective coupled droplets forming liquid drop 120 and ferrofluid drop 151, as illustrated in FIG. 8A. By way of example, channel 113 in the three substrates of FIGS. 8A-8C is a 5 mm bore-diameter channel having an aperture of 5 mm (and non-dimensionalized volume, $V/V_{sph}=0.5$, where $V_{sph}$ is the volume of a sphere of the same diameter as the orifice).

In FIG. 8B, three second channels 114' are illustrated accommodating three different coupled ferrofluid droplets 151'. In the example of FIG. 8C, seven second channels 114" are provided in substrate 110" for accommodating seven different ferrofluid droplets 151". By way of example, the radius of channel 114 in FIG. 8A may be 2.5 mm, the radius of channels 114' in FIG. 8B may be 1.5 mm, and the radius of channels 114" in FIG. 8C 1.25 mm.

Figure 8D:
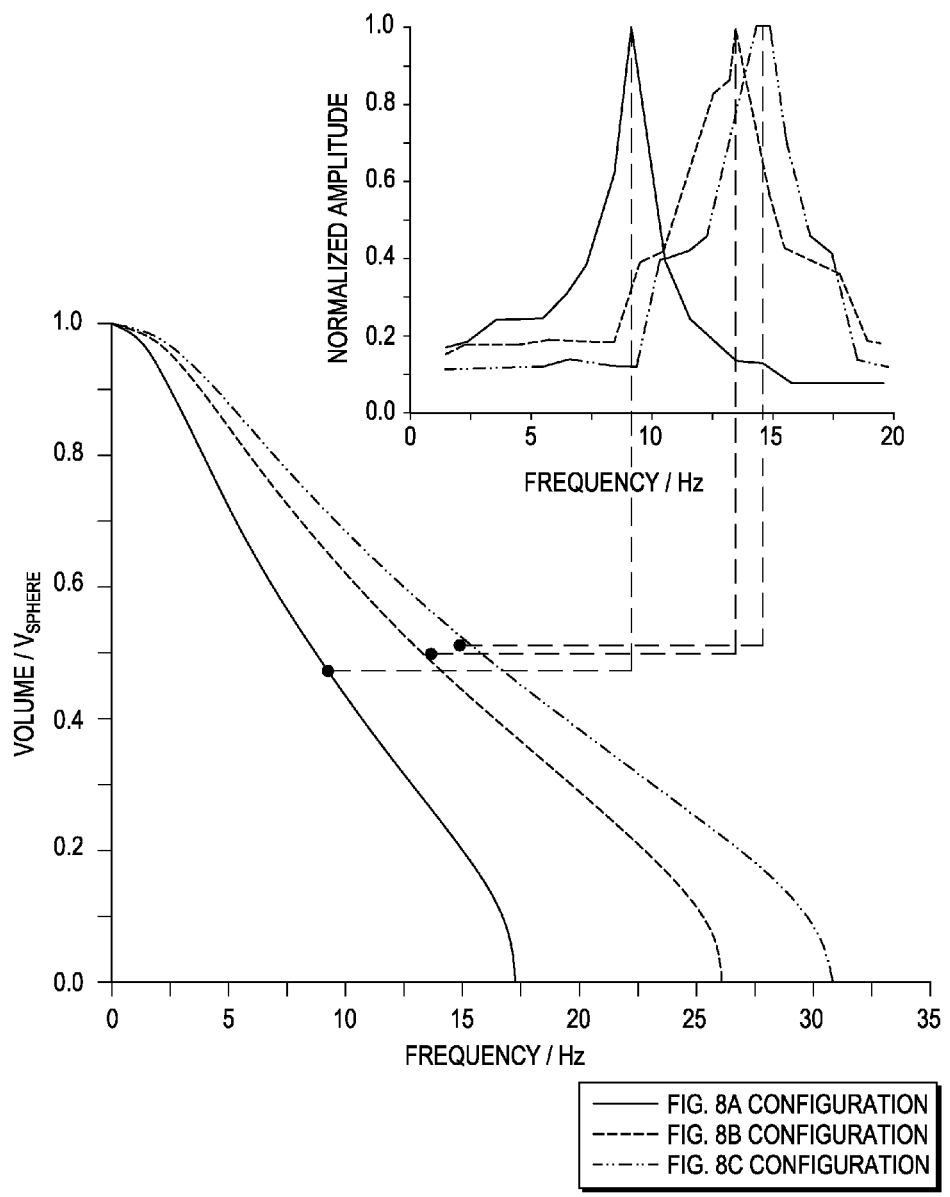
FIG. 8D is a graph illustrating resonance frequency of a liquid-liquid lens versus volume of the drops illustrated in FIGS. 8A-8C, and the insert graph illustrates experimentally-measured frequency response of each configuration depicted in FIGS. 8A-8C, in accordance with one or more aspects of the present invention.

FIG. 8D illustrates experimentally-measured frequency response (normalized by maximum amplitude for each case) of the three liquid-liquid lens system configurations depicted in FIGS. 8A-8C, and given a harmonic input to the electromagnetic driver with an amplitude of 3 volts. Driving the arrays of smaller drivers is shown to increase significantly the frequency response of the entire system, that is, significantly higher resonance frequencies can be achieved by using arrays of smaller drivers. For example, driving with arrays of small droplets, resonance frequencies in excess of 30 Hz (corresponding to 60 scans per second for each focal distance within the range) are obtainable. Good agreement between experimental and theoretical models for the liquid-liquid lenses were achieved.

Figure 9:
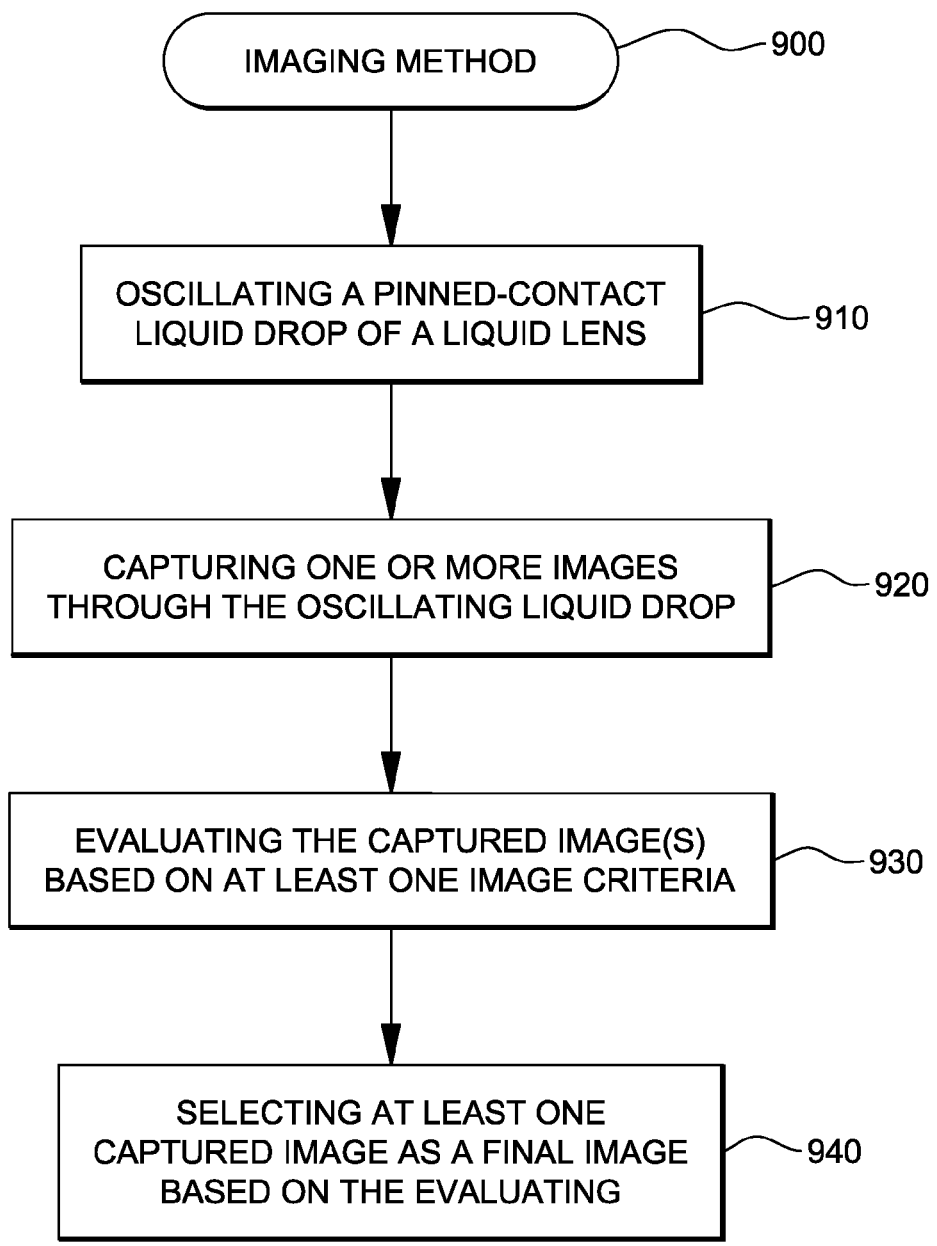
FIG. 9 is a flowchart of one embodiment of an imaging method employing an oscillating liquid-liquid lens, in accordance with an aspect of the present invention.

FIG. 9 illustrates one embodiment of an imaging method employing an oscillating liquid lens, such as described herein. The imaging method 900 includes oscillating a pinned-contact liquid drop of a liquid-liquid lens such as described herein 910, and while oscillating the liquid-liquid lens, capturing one or more images through the oscillating liquid drop 920. Specifically, the one or more images are captured through the first droplet portion and second droplet portion of the drop, which extend above the first and second surfaces, respectively, of the substrate defining the channel within which the liquid drop resides. The captured images are forwarded to a controller, which comprises (in one embodiment) a computer that includes logic to evaluate 930 the captured images based on one or more image criteria, such as sharpness of the image. Evaluation of digital images can be readily accomplished by one skilled in the art using, in part, existing image analysis software. One or more captured image(s) is then selected as one or more final image(s) based on the evaluating 940. Depending upon the implementation, the final images may be combined into a 3-D representation of an object.

Those skilled in the art will note that the pinned-contact, oscillating liquid-liquid lens described herein provides a novel solution for imaging systems where fast changes in focal distance are sought. The liquid lens can be manufactured in a small and lightweight package, with a non-invasive, oscillation driving approach, as described herein. Advantageously, relatively small voltage levels can be employed in the activation mechanism, making application of the liquid-liquid lens practical.

Disclosed herein is a liquid-liquid lens with an oscillating focal distance that can capture any image plane in a given range of the oscillations. The lens features two droplet portions coupled through a cylindrical channel (or hole), with pinned-contact lines against a non-wetting substrate. An incompressible second liquid surrounds the liquid lens in a closed chamber. A non-invasive electromagnetic drive may be employed to oscillate coupled ferrofluid droplets in a second cylindrical channel (or hole) in the substrate. Oscillation of the ferrofluid droplets results in corresponding oscillation of the liquid lens droplets via the incompressible surrounding liquid. The change in the curvature of the droplet portions induces a change in focal distance. The opposing curvature of the droplets creates a spring-like force that makes the system a natural oscillator. As image capture timing is electronic, it can be achieved rapidly, so that the frequency response of the lens is only limited by the system's resonant frequency. The liquid lens presented is a coupled-droplet system, which can be made to oscillate at resonance with very little input. When the oscillation is fast enough, the lens can be thought of as always being very close in time to being at the desired focal distance; hence, the idea of fast-focusing behind the liquid-liquid lens presented.

Advantageously, a centimeter-scaled aperture may be obtained using the liquid-liquid lens structure disclosed herein. At a scale that is small enough so that gravity is not dominant, the coupled droplet liquid lens (with pinned-contact lines) balances fluid inertia against surface tension, and the system can be made to oscillate. Experimental results have illustrated that millimeter-scale liquid lenses, and even centimeter-scaled lenses, are practical.

The large aperture, fast-adaptive liquid-liquid lens disclosed herein offers unique advantages and capabilities over existing approaches. Increased light gathering is possible with centimeter-scale aperture lenses (e.g., a 30-fold increase in light gathering capability going from a 1.68 mm diameter liquid lens in air to a 10 mm diameter liquid-liquid lens), with different driving strategies yielding oscillations over 30 Hz (i.e., frame capture rates up to 60 Hz). Energy efficiency is retained, while long-term stability issues (e.g., due to evaporation) which have traditionally plagued previous liquid-in-air lens designs, have been eliminated, all in a design that is nearly invariant with gravitational orientation.

Those skilled in the art will note that the coupled-droplet lens system presented herein can be applied in a number of applications, including mobile phones, video recorders, and other small, lightweight consumer products with video recording capabilities. Other applications include high-speed adaptive imaging, camcorders, and other 3-D image reconstruction by arrays of lenses and reconfigurability for less demanding applications, with an emphasis on energy consumption. For example, other applications include autonomous, micro-air-vehicles for surveillance and defense, which would benefit from imaging capabilities in many directions rather than just vision straight ahead (or below). The relatively small size and high energy efficiency of the liquid-liquid lens presented suits the installation of several of these lenses in such a small vehicle to realize imaging in all directions at all times.

As will be appreciated by one skilled in the art, aspects of the controller described above may be embodied as a system, method or computer program product. Accordingly, aspects of the controller may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the controller may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that certain blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, certain blocks in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that certain blocks of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. A liquid lens comprising:
    a substrate comprising at least one channel extending through the substrate between a first surface and a second surface of the substrate;
    a liquid drop comprising a first liquid, the liquid drop being disposed within one channel of the at least one channel extending through the substrate, the liquid drop comprising a first droplet portion with a first capillary surface protruding away from the first surface of the substrate, and a second droplet portion with a second capillary surface protruding away from the second surface of the substrate, the first droplet portion and the second droplet portion being connected through the one channel;
    an enclosure at least partially surrounding the substrate and comprising a chamber, the one channel of the at least one channel extending through the substrate residing within the chamber of the enclosure;
    a second liquid disposed within the chamber, the second liquid and the liquid drop comprising the first liquid being in one of direct or indirect contact within the chamber; and
    a driver for oscillating the liquid drop within the one channel.

2. The liquid lens of claim 1, wherein the first surface of the substrate facilitates defining a first chamber portion of the chamber and the second surface of the substrate facilitates defining a second chamber portion of the chamber, and wherein the second liquid substantially fills the first chamber portion and the second chamber portion.

3. The liquid lens of claim 2, wherein the second liquid and the liquid drop comprising the first liquid are in direct contact within the first chamber portion and are in direct contact within the second chamber portion.

4. The liquid lens of claim 1, wherein the driver is operatively coupled to the liquid drop within the one channel via the second liquid disposed within the chamber of the enclosure.

5. The liquid lens of claim 1, wherein the driver comprises an oscillator operatively coupled to at least one of the first droplet portion or the second droplet portion of the liquid drop for oscillating the liquid drop within the one channel, wherein the oscillator allows continuous or intermittent oscillation of the liquid drop within the one channel, and hence, the first droplet portion and the second droplet portion of the liquid drop.

6. The liquid lens of claim 1, wherein the second liquid and the liquid drop comprising the first liquid are in direct contact and are immiscible.

7. The liquid lens of claim 6, wherein the one channel extending through the substrate is a first channel extending through the substrate, and wherein the first surface of the substrate facilitates defining a first chamber portion of the chamber, and the second surface of the substrate facilitates defining a second chamber portion of the chamber, the second liquid substantially filling the first chamber portion and the second chamber portion, and wherein the driver comprises:
    at least one ferrofluid drop disposed in at least one second channel extending through the substrate between the first surface and the second surface of the substrate, the at least one ferrofluid drop displacing the liquid drop within the first and second chamber portions of the chamber as the at least one ferrofluid drop oscillates between the first and second chamber portions of the chamber; and
    an electromagnetic driver for oscillating the at least one ferrofluid drop within the at least one second channel, and thus, oscillating the liquid drop within the first channel.

8. The liquid lens of claim 7, wherein the driver comprises multiple ferrofluid drops disposed in multiple second channels extending through the substrate between the first surface and the second surface of the substrate, wherein volume of each ferrofluid drop of the multiple ferrofluid drops is less than a volume of the liquid drop within the first channel extending through the substrate, the multiple ferrofluid drops displacing the liquid drop within the first and second chamber portions of the chamber as the multiple ferrofluid drops oscillate between the first and second chamber portions of the chamber.

9. The liquid lens of claim 7, wherein the electromagnetic driver is a first electromagnetic driver, and wherein the driver further comprises a second electromagnetic driver, the first electromagnetic driver and the second electromagnetic driver together oscillating the at least one ferrofluid drop within the at least one second channel, and thus, oscillating the liquid drop within the first channel.

10. The liquid lens of claim 1, wherein the first liquid comprises a high index of refraction fluid and the second liquid comprises water.

11. The liquid lens of claim 1, wherein the first liquid, the second liquid, and the substrate are chosen to facilitate the liquid drop remaining pinned at an edge of the substrate at the one channel.

12. The liquid lens of claim 1, wherein the enclosure comprises a transparent housing portion disposed over at least the first droplet portion or the second droplet portion of the liquid drop, and wherein the chamber is a sealed chamber.

13. An imaging system comprising:
a liquid lens comprising:
a substrate comprising at least one channel extending through the substrate between a first surface and a second surface of the substrate;
a liquid drop comprising a first liquid, the liquid drop being disposed within one channel of the at least one channel extending through the substrate, the liquid drop comprising a first droplet portion with a first capillary surface protruding away from the first surface of the substrate, and a second droplet portion with a second capillary surface protruding away from the second surface of the substrate, the first droplet portion and the second droplet portion being connected through the one channel;
an enclosure at least partially surrounding the substrate and comprising a chamber, the one channel of the at least one channel extending through the substrate residing within the chamber of the enclosure;
a second liquid disposed within the chamber, the second liquid and the liquid drop comprising the first liquid being in one of direct or indirect contact within the chamber; and
a driver for oscillating the liquid drop within the one channel extending through the substrate; and
at least one imaging sensor coupled to at least one imaging path passing through the first and second droplet portions of the oscillating liquid drop in the one channel for capturing an image through the first and second droplet portions of the oscillating liquid drop.

14. The imaging system of claim 13, wherein the at least one image sensor is operatively coupled to the at least one image path for capturing an image through the first and second droplet portions of the oscillating liquid drop while the first and second droplet portions of the liquid drop are continuously or intermittently oscillating.

15. The imaging system of claim 13, further comprising a controller coupled to the driver and configured to control oscillations of the liquid drop within the one channel of the substrate.

16. The imaging system of claim 13, wherein the liquid lens is a pinned-contact, oscillating liquid lens.

17. The imaging system of claim 13, wherein the first surface of the substrate facilitates defining a first chamber portion of the chamber and the second surface of the substrate facilitates defining a second chamber portion of the chamber, and wherein the second liquid substantially fills the first chamber portion and the second chamber portion, and wherein the second liquid and the liquid drop comprising the first liquid are in direct contact within the first chamber portion and are in direct contact within the second chamber portion, and are immiscible.

18. The imaging system of claim 13, wherein the one channel extending through the substrate is a first channel extending through the substrate, and the driver comprises:
at least one ferrofluid drop disposed in at least one second channel extending through the substrate between the first surface and the second surface of the substrate, the at least one ferrofluid drop displacing the liquid drop within the first and second chamber portions of the chamber as the at least one ferrofluid drop oscillates between the first and second chamber portions of the chamber; and
an electromagnetic driver for oscillating the at least one ferrofluid drop within the at least one second chamber, and thus, oscillating the liquid drop within the first channel.

19. The imaging system of claim 13, wherein the enclosure comprises a transparent housing portion disposed over at least one of the first droplet portion or the second droplet portion of the liquid drop, and wherein the chamber is a sealed chamber.

20. An imaging method comprising:
oscillating a liquid drop of a liquid lens, the liquid lens comprising a substrate defining a channel extending between a first surface and a second surface thereof, with the liquid drop being disposed within the channel, the liquid drop comprising a first droplet portion including a first capillary surface protruding away from the first surface of the substrate and a second droplet portion comprising a second capillary surface protruding away from the second surface of the substrate, wherein the first and second droplet portions of the liquid drop are connected through the channel, the liquid lens further comprising an enclosure at least partially surrounding the substrate and comprising a chamber, the one channel residing within the chamber and the chamber comprising a second liquid, the second liquid and the liquid drop comprising the first liquid being in one of direct or indirect contact within the chamber, and wherein the oscillating comprises applying an oscillating force to at least one of the first droplet portion or the second droplet portion to oscillate the liquid drop within the channel; and
capturing at least one image via an image path passing through at least one of the first or second droplet portions of the liquid drop.

21. The imaging method of claim 20, further comprising:
capturing multiple images through the first and second droplet portions of the oscillating liquid drop;
evaluating the captured images based on at least one image criteria; and
selecting at least one captured image as a final image based on the evaluating.

22. The imaging method of claim 21, wherein the capturing occurs across a period of oscillation of the oscillating liquid lens and the evaluating comprises selecting at least one in-focus image from the multiple images.

23. A method of fabricating a liquid lens comprising:
obtaining a substrate, the substrate being non-wetting relative to a liquid drop;
providing at least one channel in the substrate extending from a first surface to a second surface thereof;

providing the liquid drop comprising a first liquid within one channel of the at least one channel extending through the substrate, the liquid drop comprising a first droplet portion with a first capillary surface protruding away from the first surface of the substrate and a second droplet portion with a second capillary surface protruding away from the second surface of the substrate, the first droplet portion and the second droplet portion being connected through the one channel;

providing an enclosure comprising a chamber enclosing the one channel extending through the substrate, the first surface of the substrate facilitating defining a first chamber portion of the chamber, and the second surface of the substrate facilitating defining a second chamber portion of the chamber, wherein he first droplet portion resides within the first chamber portion of the chamber and the second droplet portion resides within the second chamber portion of the chamber; and disposing a second liquid within the first chamber portion and the second chamber portion of the chamber, the second liquid and the liquid drop being in one of direct or indirect contact within the chamber.

24. The method of claim 23, further comprising operatively coupling a driver to at least one of the first droplet portion or the second droplet portion of the liquid drop in the one channel for oscillating the liquid drop, and hence, the first and second droplet portions of the liquid drop, wherein oscillating the liquid drop facilitates capture of images through the liquid lens at different focal distances.

25. The method of claim 23, wherein the second liquid and the liquid drop comprising the first liquid are in direct contact and are immiscible, and the one channel extending through the substrate is a first channel extending through the substrate, and wherein the first surface of the substrate facilitates defining a first chamber portion of the chamber, and the second surface of the substrate facilitates defining a second chamber portion of the chamber, the second liquid substantially filling the first chamber portion and the second chamber portion, and wherein operatively coupling the driver comprises:

providing at least one ferrofluid drop disposed in at least one second channel extending through the substrate between the first surface and the second surface of the substrate, the at least one ferrofluid drop displacing the liquid drop within the first and second chamber portions of the chamber as the at least one ferrofluid drop oscillates between the first and second chamber portions of the chamber; and providing an electromagnetic driver for oscillating the at least one ferrofluid drop within the at least one second channel, and thus, oscillating the another liquid drop within the first channel.

* * * * *